United States Patent Office 3,148,838
Patented Sept. 15, 1964

3,148,838
METHOD OF PREPARING METAMORPHOSED IRON ORES FOR CONCENTRATION
Patrick Edgar Cavanagh, West Mount, Montreal, Quebec, Canada, assignor to Premium Iron Ores Limited
Filed July 24, 1961, Ser. No. 126,158
1 Claim. (Cl. 241—14)

This invention relates to a method of preparing iron bearing ore especially of the mixed magnetite-hematite variety for concentration prior to smelting.

It is known that many of the largest iron ore deposits have the iron in the form of the oxides magnetite and hematite present in a variety of proportions one to the other. Normally, in order to prepare an iron ore for concentration, the liberation size, which is the size to which all the ore is required to be ground to produce a concentrate of a desired grade and at the desired iron recovery, is determined after which all of the ore is ground to this size and concentrated by any one of a number of well known processes.

As an example, in order to produce a concentrate grade of at least sixty-five percent iron and an iron recovery of at least eighty-five percent from a particular iron ore found in the Ungava district in Quebec, Canada, the liberation size and therefore the size to which the ore must be ground is minus two hundred mesh. The necessary fine grinding, in order to obtain an acceptable recovery, is a disadvantage with present methods. In addition, in concentrating the crushed ore, the fine size makes it obligatory to use such methods as costly flotation processes for a mixed magnetite-hematite which is high in hematite.

Furthermore, in concentrating mixed magnetite-hematite ore by conventional methods, it is difficult to obtain good recovery of the hematite portion while obtaining optimum recovery of the magnetite. In the case where the magnetite-hematite ratio favours the latter, the loss of iron in the process is substantial.

Accordingly, it is an object of this invention to provide a method of preparing iron ore for concentration that will minimize the loss of hematite in the concentration process.

It is a further object of this invention to provide a method of preparing iron ore for concentration that is adaptable for use with a variety of ore types as found in different deposits.

It is a further object of this invention to provide a method of preparing iron ore for concentration having simple means to determine the required flowsheet for any particular ore deposit.

These and other objects and features of this invention will become apparent when taken into consideration with the following detailed description and drawings.

Figure 1:
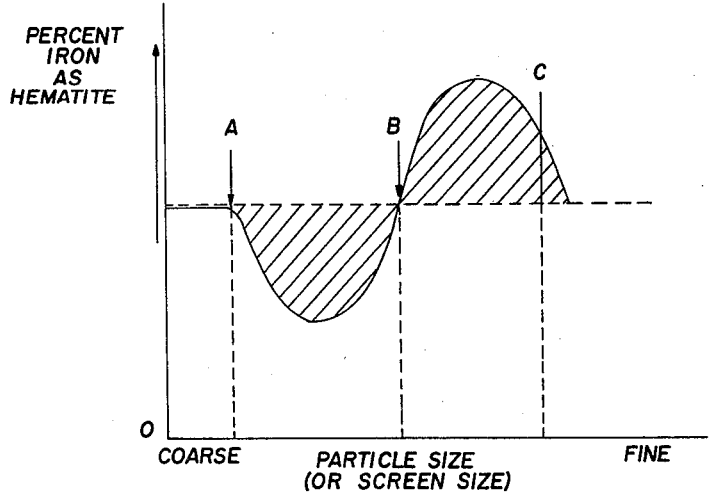
Figure 2:
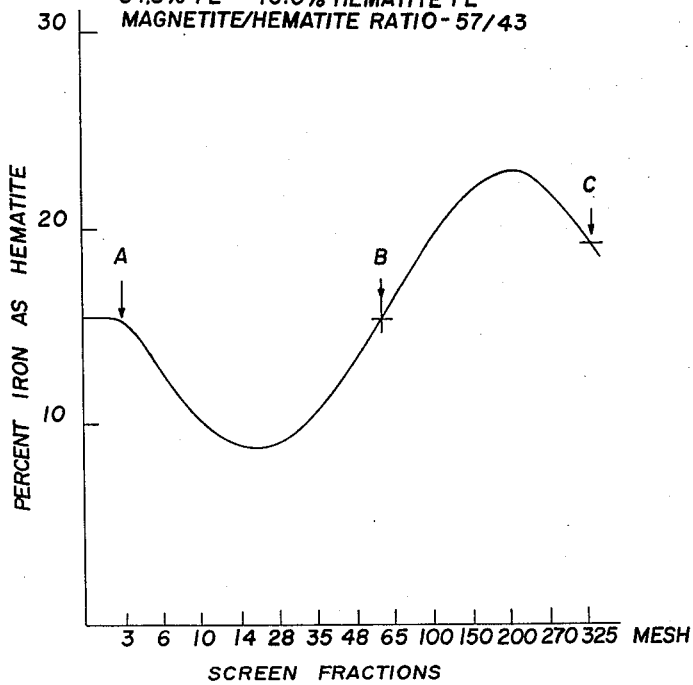
Figure 3:
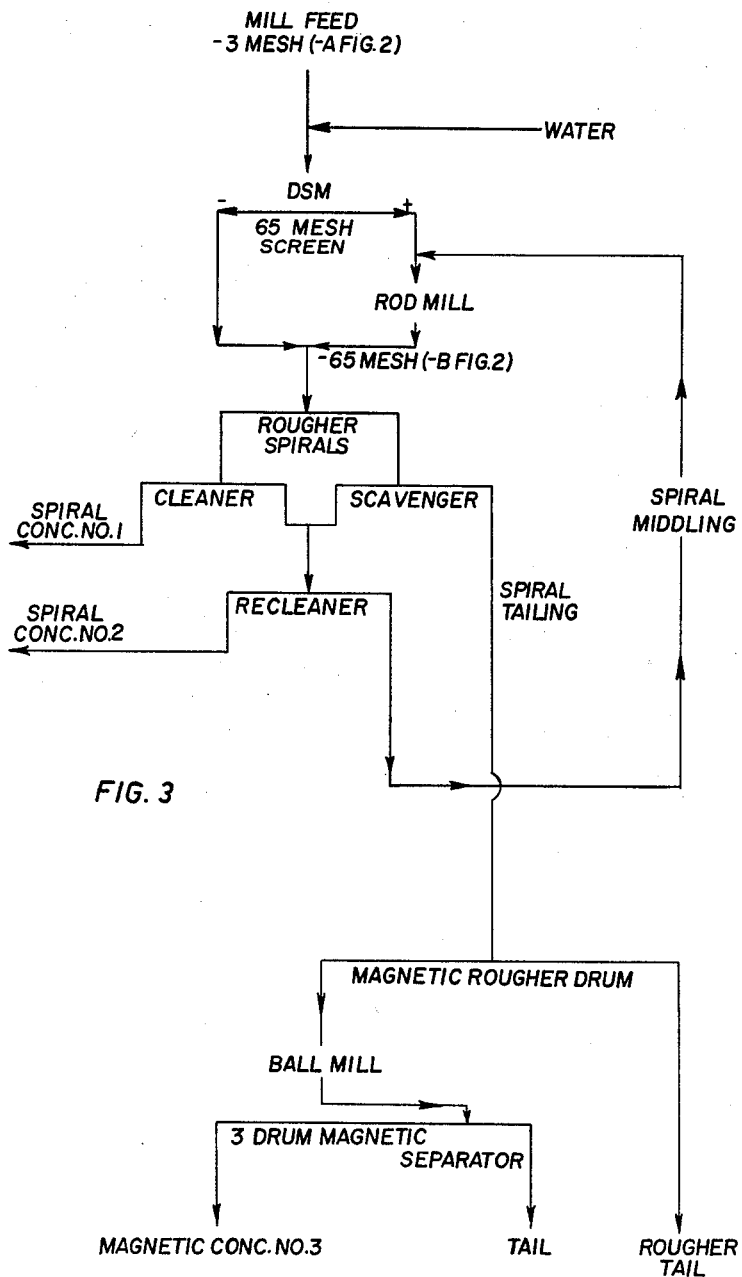

In the drawings:
FIGURE 1 is a graph representing the method of testing an ore sample;
FIGURE 2 is a graph of the method of testing a specific ore sample; and,
FIGURE 3 is a flowsheet of the present method as applied to a conventional concentration process for the same ore sample.

It has been discovered that the metamorphosed magnetite-hematite ores behave during grinding and concentration as if their present structure had resulted from the following sequence of events.

Firstly, at one time in the past, the ore beds consisted of very finely disseminated iron minerals in the form of carbonates, oxides, hydroxides, silicates or other forms dispersed through a fine crystalline gangue consisting mainly of quartz.

Secondly, due to an increase in temperature in the ore beds accompanied by increasing pressure probably due to folding and faulting of the earth's crust, and to both these effects being applied over very long periods of time, some of the ore beds were metamorphosed. This means that the structure was changed due to the effects of heat and pressure, which caused the gangue minerals, and the quartz in particular, to undergo crystal growth. During the growth of the quartz crystals most of the dispersed iron minerals migrated to crystal boundaries at the same time undergoing crystal growth by coalescing with other iron mineral crystals. The result of this mechanism was to produce much enlarged quartz crystals with enlarged iron mineral crystals at the crystal boundaries. At the same time, changed conditions converted some of the minerals to magnetite and hermatite; the resulting proportion of each depending upon the local existing oxygen potential within the ore bed and the composition of the original iron minerals.

As a result of this mechanism of metamorphism this metamorphosed type of ore now behaves as though it is a two component system. The one component is the residual unmetamorphosed ore which is mainly a dispersed fine magnetite in a fine grained gangue. The second constituent is a metamorphosed ore which consists of coarser grains of magnetite and hematite accompanied by still coarser grains of recrystallized quartz and gangue minerals.

Crystal growth of quartz at temperatures over 572° C. is accompanied by a phase change and an increase in volume of four percent. Conversion of magnetite to hematite is also accompanied by a volume increase. These effects give rise to a weak, friable structure, easily burst apart by impact, in the metamorphosed, high hematite portions of such an ore.

In general, results of examination of various ores suggest that in many instances the higher the ratio of hematite to magnetite in ores in the same district the higher the degree of metamorphism.

Since the hematite crystals are derived from the growing quartz crystals in accordance with the well-known laws of nucleation and diffusion, it is possible to calculate the size of quartz crystal which must have given rise to a certain size of hematite crystal. For an ore which contains thirty-five percent iron, the weight of recrystallized quartz will be almost exactly equal to the weight of hematite derived from it. Since the density of pure hematite is nearly double the density of quartz, the volume of a quartz crystal, from which a hematite crystal was derived, will be about double the volume of the hematite crystal. This results in the important conclusion that where metamorphism has resulted in this type of structure there will be present large quartz crystals about double the size of the metamorphosed hematite and magnetite crystals in the ore.

The most important of the two constituents of this metamorphosed type of ore, from the concentration point of view, is the friable, relatively coarse grained higher hematite metamorphosed portion. Crushing or grinding of the ore to a size close to the size of the biggest quartz grains will result in the much smaller hematite grains being knocked loose from the quartz crystals, to which they are very weakly attached, and being freed as smaller clean crystals of hematite.

It has been discovered that upon an ore of this type being crushed to a coarse size of say minus one-half inch and then screened into sized fractions on a standard series of screens, these screened fractions can be analyzed for hematite iron and the variation of hematite iron with screen size of the particles can be plotted to give a curve of the type shown in FIGURE 1. From this curve can be determined the proper method of preparing a particular ore for concentration.

The point "A" in FIGURE 1 therefore indicates the size of the coarsest, clean, recrystallized gangue in the ore.

Upon the percentage of hematite iron beginning to rise, the line intersects the average value for hematite iron in the ore, and the point "B" is reached. This point indicates the size of the largest crystals of liberated hematite which have been released from the coarser sizes of crushed ore.

The percentage of hematite iron falls off rapidly in the finer screen sizes and point "C" indicates a value half-way between the maximum hematite iron content and the average for the ore.

The method of determining the best preparation of the ore for concentration, by means of such curves, is only valid upon the hematite iron lost from the coarse screen fractions, where hematite iron is less than the average for the ore, being equal to the gain in hematite iron in the fine screen fractions, where hematite iron is higher than the average for the ore. Upon the curves being drawn on a proper scale, the shaded areas represent percentage of hematite iron and are equal.

In using this method to specify the preparation of a metamorphosed ore for concentration, these are the steps to be followed.

The ore is crushed or ground in such a way that it is all minus screen size at (A) for the particular ore, and preferably not more than about twenty percent minus screen size (C) for the particular ore.

The crushed or ground ore is screened on a screen of size (B) for the particular ore, or otherwise sized into two fractions coarser and finer than size (B).

The coarse fraction of the ore, which is the oversize from this screen, is reground separately in such a way as to be finer than screen size (B), to have hematite iron in the screened fractions to coincide as closely as possible to the original curve below screen size (B) and preferably to have not more than thirty percent minus screen size (C).

The separate treatment of this coarse fraction $(-A+B)$ is very advantageous since it contains very tough, hard quartz crystals which are difficult to grind and which also contain little or no recoverable iron. For an ore with a high ratio of magnetite to hematite the iron in this fraction is predominantly in the form of magnetite, finely disseminated in the non-metamorphosed portion of the ore. It is therefore desirable, in such cases to pass this coarse fraction over a magnetic separator, rejecting the clean coarse quartz crystals as a tailing, before regrinding the coarse $(-A+B)$ portion of the ore to $(-B)$ size. In the case of ores which are predominantly hematite, other conventional methods such as electrostatic separation, Humphrey Spiral separator or heavy media separation and the like can be used to reject the clean quartz tailing. In any case after rejection of the clean tailing the residual $(-A+B)$ ore is ground to $(-B)$ size and added to the fine $(-B)$ fraction.

The fine portion $(-B)$ plus the added ground $(-A+B)$ fraction of the ore is then concentrated by such methods as Humphrey Spiral Separation, Heavy Media Separation, High Intensity Magnetic Separation or other satisfactory methods depending on the fineness of this fraction in the particular ore and the preferred method of treatment. The iron recovered by this concentration treatment consists mainly of the relatively coarse metamorphosed crystals of hematite and magnetite.

This leaves the fine disseminated magnetite remaining in the unmetamorphosed portion of the ore to be recovered. This portion of the ore constitutes most of the tailings from the concentration of the two combined $(-B)$ fractions above described. These tailings are ground to a much finer size to liberate the fine disseminated magnetite whereby it is then recoverable by magnetic separation as a high grade concentrate.

As a specific example, the treatment of Ungava Iron Ores from Hopes Advance Bay in Ungava, Quebec, may be cited. The curve showing percentage of hematite iron versus screen size is as shown in FIGURE 2. The flow sheet used is as shown in FIGURE 3. Several other types of equipment could be used to concentrate this ore upon it being properly prepared by this method. The equipment illustrated, namely: Humphrey Spirals and Magnetic Separator, are very well known and economical to use.

The results obtained are excellent and are unusually good for this simple type of flowsheet and for this type of ore.

From the foregoing it will be evident that the process comprises crushing the ore to a size which approximates the largest average size of the gangue crystals present in the ore, whereafter the crushed ore is screened to a size approximating the largest hematite crystals. If desirable, the plus portion from the first screening is then passed through a separating stage, such as for instance magnetic separation, wherein the comparatively coarse quartz is removed. The remaining coarse ore is then ground to the same size as that of the largest hematite crystals, added to the minus portion from the screening and then concentrated. The tailing from this concentration is then reground to liberate the residual fine iron oxide and then concentrated.

This provides two concentrates:

(1) A relatively coarse $(-B)$ concentrate.
(2) A relatively fine concentrate.

What I claim is:

A method for preparing metamorphosed iron ores containing hematite for concentration comprising: analyzing screened fractions of a sample of the crushed ore and plotting the variation in hematite iron content versus screen size in the screened fractions to determine the average hematite content for the ore; comminuting ore to a size represented by that size at which the hematite iron content falls below the average hematite iron content; separating the comminuted ore into sized fractions coarser and finer than the size at which the hematite iron content first exceeds the average hematite iron content for the ore; recovering the iron values from the finer fraction so separated; rejecting a substantially clean tailing from said coarser fraction; and then regrinding the remainder of said coarse fraction to render the same adaptable for the recovery of iron values therefrom.

References Cited in the file of this patent
UNITED STATES PATENTS

| | | |
|---|---|---|
| 1,921,306 | Alrich | Aug. 8, 1933 |
| 2,765,988 | Hague i Dalane | Oct. 9, 1956 |
| 2,962,321 | Weston | Nov. 29, 1960 |
| 2,990,124 | Cavanagh et al. | June 27, 1961 |
| 3,022,956 | Haseman | Feb. 27, 1962 |
| 3,067,957 | Erck et al. | Dec. 11, 1962 |

FOREIGN PATENTS

| | | |
|---|---|---|
| 488,344 | Italy | Dec. 18, 1953 |

OTHER REFERENCES

U.S. Dept. of Interior Report R.I. 3523, June 1940, by Coghill et al. (6 pages).